UNITED STATES PATENT OFFICE.

BENJAMIN A. BERRY, OF TOLEDO, OHIO.

STOCK FEED.

1,228,175.   Specification of Letters Patent.   Patented May 29, 1917.

No Drawing.   Application filed December 1, 1916.   Serial No. 134,393.

*To all whom it may concern:*

Be it known that I, BENJAMIN A. BERRY, a citizen of the United States, and a resident of Toledo, in the county of Lucas and State of Ohio, have invented a certain new and useful Stock Feed; and I do hereby declare the following to be a full, clear, and exact description of the invention, such as will enable others skilled in the art to which it appertains to make and use the same.

This invention relates to a live stock feed.

The primary object of my invention is to utilize the stomach contents of farm stock, such, for instance, as cattle, sheep and hogs, after being killed, as a stock feed, whereby to not only realize profit from such by-product of stock, but also to obtain a feed which is nutritious and of greater value for stock feeding than natural foods, by reason of the presence therein of the gastric and other digestive juices of the stomach.

In the preferred manner of producing my new food I take the stomach contents, preferably of cattle and hogs, immediately or very shortly after killing, mix them together and subject the mixture to a sterilizing and drying treatment, or the stomach contents of the two animals may be separately dried and sterilized, and then thoroughly mixed. After the drying treatment, salt and chopped hay, or hay meal, as it is sometimes called, in the proportions approximately of 2 and 10 pounds, respectively, to 100 pounds of the dried stomach content mixture, is preferably added to and thoroughly mixed with said mixture. This makes a most delicious, nutritious and fattening feed for cattle, sheep, hogs and other stock. It is also preferable to add brown sugar to the mixture in the proportion of about 5 pounds to 100 pounds of the feed.

It is particularly desirable, although not necessary, that the mixed stomach contents contain both hay and corn or grain, and for this reason the stomach contents of cattle and hogs is more particularly mentioned, as cattle more naturally feed on hay and hogs on corn or grain. It will be understood, however, that my invention is not limited to the stomach contents of any particular animal or animals, as in some cases the contents of one animal alone might be sufficient and in other cases it might be desirable to take the stomach contents of different animals which have been fed on different kinds of feed. The invention broadly contemplates the utilization of the stomach contents more particularly of hay and corn or grain eating animals as a live stock feed, and the purpose of adding salt and chopped hay thereto is to bring it back to life after the sterilizing and drying process.

The feed which is produced as above described has the appearance of more or less finely chopped or broken-up hay and corn, and dried with this are the stomach juices, which add materially to the food value thereof. The chopped hay, which is added after the drying treatment, is preferably alfalfa meal, but may be timothy, clover or other kinds of hay.

In sterilizing the stomach contents it is preferably heated to a temperature of from 170° to 190° F., and in drying it is preferably heated to about 160° F. for approximately an hour. The wet mass removed from the stomach should be sterilized and dried very shortly after such removal in order to prevent souring.

The mass taken from the stomach of a critter of ordinary size weighs about 150 pounds and dries out to about 60 pounds, and that taken from the stomach of a hog weighs about 7 pounds and dries out to about 4 or 4½ pounds. This matter has heretofore, so far as I am aware, been used only as fertilizer or thrown away.

I wish it understood that the particular description herein given is merely illustrative of one form of the invention and that the process or product obtained thereby is not to be limited beyond the scope to which it is entitled.

Having thus described my invention, what I claim as new, and desire to secure by Letters Patent, is—

1. A stock feed consisting of the dried stomach contents of butchered farm stock.

2. A stock feed consisting of the dried stomach content of butchered hay and corn or grain eating animals.

3. A stock feed consisting of dried stomach contents of butchered cattle and hogs.

4. A stock feed consisting of the dried and sterilized stomach contents of butchered farm stock with a small proportion of salt added thereto.

5. A stock feed consisting of the dried and sterilized contents of butchered farm stock with small proportions of salt and chopped hay added thereto.

6. A stock feed consisting of the dried and sterilized stomach contents of butchered hay and corn or grain eating animals mixed together, and having salt and chopped hay mixed therewith in the proportions approximately of 2 and 10 pounds, respectively, to 100 pounds of the dried stomach contents, together with a sweetening agent.

In testimony whereof I have hereunto signed my name to this specification.

BENJAMIN A. BERRY.

Copies of this patent may be obtained for five cents each, by addressing the "Commissioner of Patents, Washington, D. C."